US012617157B2

(12) United States Patent     (10) Patent No.:   US 12,617,157 B2

Sabo et al.     (45) Date of Patent:    May 5, 2026

(54) METHOD FOR MANUFACTURING LOW MODULUS ARTICLES

(71) Applicant: 3D Systems, Inc., Rock Hill, SC (US)

(72) Inventors: David Sabo, San Diego, CA (US); Grant Draper, San Diego, CA (US); Curtis J. Behrend, San Diego, CA (US)

(73) Assignee: 3D SYSTEMS, INC., Rock Hill, SC (US)

( * ) Notice: Subject to any disclaimer, the term of this patent is extended or adjusted under 35 U.S.C. 154(b) by 226 days.

(21) Appl. No.: 18/436,246

(22) Filed: Feb. 8, 2024

(65) Prior Publication Data

US 2024/0269932 A1    Aug. 15, 2024

Related U.S. Application Data

(60) Provisional application No. 63/484,354, filed on Feb. 10, 2023.

(51) Int. Cl.
    B29C 64/124     (2017.01)
    B29C 64/129     (2017.01)
    (Continued)

(52) U.S. Cl.
    CPC .......... B29C 64/393 (2017.08); B29C 64/124 (2017.08); B29C 64/129 (2017.08);
    (Continued)

(58) Field of Classification Search
    CPC ............................ B29C 64/124; B29C 64/232
    See application file for complete search history.

(56) References Cited

U.S. PATENT DOCUMENTS 5,174,931 A   *   12/1992   Almquist ................. G05D 9/12
                                                  118/712
8,372,330 B2     2/2013   El-Siblani et al.
                      (Continued)

FOREIGN PATENT DOCUMENTS

CN         109109317 A   *   1/2019   ........... B29C 64/386
KR         101776509 B1   *   9/2017   ............. G01B 11/26
                      (Continued)

OTHER PUBLICATIONS

Machine translation of KR-101776509-B1, retrieved from USPTO database Mar. 10, 2026 (Year: 2026).*

(Continued)

*Primary Examiner* — Timothy Kennedy

(57)                ABSTRACT

A method of manufacturing a 3D article includes operating a 3D printing system including an elevator coupled to a vertical movement mechanism, and a distance sensor. The elevator includes an elevator actuator. The vertical movement mechanism is coupled to the elevator. The build platform includes a build plate having a lower surface. The method includes loading the build platform onto the elevator, operating the vertical movement mechanism to lower the lower surface of the build platform into a measurement range with the distance sensor, scanning the distance sensor along a lateral axis, concurrent with scanning the distance sensor, receiving a signal from the distance sensor indicative of a plurality of vertical locations along the lateral axis of the lower surface of the build platform, and operating the elevator actuator to adjust a height of the lower surface of the build platform.

20 Claims, 11 Drawing Sheets

(51) Int. Cl.

| | |
|---|---|
| *B29C 64/232* | (2017.01) |
| *B29C 64/241* | (2017.01) |
| *B29C 64/245* | (2017.01) |
| *B29C 64/393* | (2017.01) |
| *B33Y 10/00* | (2015.01) |
| *B33Y 30/00* | (2015.01) |
| *B33Y 50/02* | (2015.01) |

(52) U.S. Cl.
CPC .......... *B29C 64/232* (2017.08); *B29C 64/241* (2017.08); *B29C 64/245* (2017.08); *B33Y 10/00* (2014.12); *B33Y 30/00* (2014.12); *B33Y 50/02* (2014.12)

(56) References Cited

U.S. PATENT DOCUMENTS

| | | | | |
|---|---|---|---|---|
| 9,067,361 | B2 | 6/2015 | El-Siblani | |
| 9,346,217 | B2* | 5/2016 | Huang | B29C 64/241 |
| 9,346,218 | B2* | 5/2016 | Chen | B29C 64/255 |
| 9,821,518 | B2* | 11/2017 | Bloom | B29C 64/106 |
| 10,011,076 | B2 | 7/2018 | El-Siblani et al. | |
| 10,059,060 | B2* | 8/2018 | Asahina | B29C 64/129 |
| 10,350,827 | B2 | 7/2019 | Nolet et al. | |
| 10,611,080 | B2* | 4/2020 | Dachs, II | B33Y 10/00 |
| 10,647,055 | B2 | 5/2020 | Wynne et al. | |
| 10,723,069 | B2 | 7/2020 | Prucha et al. | |
| 10,843,411 | B2 | 11/2020 | Ong et al. | |
| 10,933,580 | B2 | 3/2021 | Truong et al. | |
| 11,097,476 | B2 | 8/2021 | Nolet et al. | |
| 11,235,515 | B2 | 2/2022 | Lawless et al. | |
| 11,376,798 | B2 | 7/2022 | Ong et al. | |
| 11,390,027 | B2 | 7/2022 | Lobovsky et al. | |
| 11,465,338 | B2 | 10/2022 | Elsey | |
| 11,472,106 | B2* | 10/2022 | Dravantti | B33Y 30/00 |
| 11,801,642 | B2 | 10/2023 | Truong et al. | |
| 11,868,045 | B2 | 1/2024 | Elsey et al. | |
| 12,544,976 | B2* | 2/2026 | Sabo | B29C 64/232 |
| 2001/0042942 | A1* | 11/2001 | Hizumi | B29C 64/194 264/494 |
| 2014/0085620 | A1* | 3/2014 | Lobovsky | B29C 64/245 355/72 |
| 2015/0064298 | A1* | 3/2015 | Syao | B29C 64/124 425/169 |
| 2015/0147424 | A1* | 5/2015 | Bibas | B33Y 30/00 425/150 |
| 2015/0151489 | A1* | 6/2015 | Elsey | B29C 35/0805 264/401 |
| 2015/0231824 | A1* | 8/2015 | Kobayashi | B29C 70/545 264/401 |
| 2015/0367580 | A1* | 12/2015 | Touma | B33Y 50/02 700/98 |
| 2016/0361872 | A1* | 12/2016 | El-Siblani | B29C 64/40 |
| 2017/0210080 | A1* | 7/2017 | Ding | F16C 29/12 |
| 2017/0246797 | A1 | 8/2017 | Lambrecht et al. | |
| 2017/0274595 | A1* | 9/2017 | Swartz | B29C 64/165 |
| 2018/0093429 | A1* | 4/2018 | Huang | B29C 64/124 |
| 2018/0297285 | A1 | 10/2018 | Sheppard et al. | |
| 2018/0347969 | A1* | 12/2018 | Snelling, Jr. | G01B 11/002 |
| 2018/0370148 | A1* | 12/2018 | Sekine | B33Y 40/00 |
| 2019/0001575 | A1* | 1/2019 | Lopez | B29C 64/165 |
| 2019/0022947 | A1* | 1/2019 | Ho | B33Y 50/02 |
| 2019/0091934 | A1* | 3/2019 | Cooper | B29C 64/393 |
| 2019/0184630 | A1 | 6/2019 | Turner et al. | |
| 2019/0217534 | A1* | 7/2019 | Verboomen | B29C 64/135 |
| 2019/0217540 | A1* | 7/2019 | Tomioka | B33Y 50/02 |
| 2019/0337227 | A1* | 11/2019 | Oshima | B33Y 10/00 |
| 2019/0351614 | A1 | 11/2019 | Nolet et al. | |
| 2019/0381730 | A1* | 12/2019 | Lu | B29C 64/232 |
| 2020/0262152 | A1* | 8/2020 | Dardis | B29C 64/153 |
| 2020/0324466 | A1* | 10/2020 | Nishida | B29C 64/255 |
| 2021/0245443 | A1 | 8/2021 | Moldave et al. | |
| 2021/0260824 | A1 | 8/2021 | Dravantti | |
| 2021/0362433 | A1* | 11/2021 | Enslow | B29C 64/245 |
| 2022/0355548 | A1* | 11/2022 | Wynne | B29C 64/135 |
| 2024/0001611 | A1* | 1/2024 | Zhan | B29C 64/124 |
| 2024/0217176 | A1* | 7/2024 | Zhan | B29C 64/124 |

FOREIGN PATENT DOCUMENTS

| | | | | |
|---|---|---|---|---|
| KR | 20170111624 | A * | 10/2017 | B29C 64/245 |
| KR | 20170142472 | A * | 12/2017 | B33Y 50/02 |
| KR | 20200002158 | A * | 1/2020 | B33Y 10/00 |

OTHER PUBLICATIONS

Machine translation of KR-20170111624-A, retrieved from USPTO database Mar. 10, 2026 (Year: 2026).*
Machine translation of KR-20170142472-A, retrieved from USPTO database Mar. 10, 2026 (Year: 2026).*
Machine translation of CN-109109317-A, retrieved from USPTO database Mar. 10, 2026 (Year: 2026).*
Machine translation of KR-20200002158-A, retrieved from USPTO database Mar. 10, 2026 (Year: 2026).*
PCT International Search Report for International Search Authority for PCT/US2024/014940 mailed May 23, 2024 (6 pages).
PCT International Written Opinion for International Search Authority for PCT/US2024/014940 mailed May 23, 2024 (6 pages).

* cited by examiner

METHOD FOR MANUFACTURING LOW MODULUS ARTICLES

CROSS REFERENCE TO RELATED APPLICATIONS

This non-provisional patent application claims priority to U.S. Provisional Application Ser. No. 63/484,354, Entitled "Method for Manufacturing Low Modulus Articles" by David Sabo et al., filed on Feb. 10, 2023, incorporated herein by reference under the benefit of U.S.C. 119(e).

FIELD OF THE INVENTION

The present disclosure concerns an apparatus and method for fabrication of solid three dimensional (3D) articles of manufacture from radiation curable materials. More particularly, the present disclosure concerns an apparatus for producing customized and extremely precision 3D articles.

BACKGROUND

Three dimensional (3D) printers are in rapidly increasing use for manufacturing customized articles. One class of 3D printers includes stereolithography printers having a general principle of operation including the selective curing and hardening of radiation curable (i.e., photocurable) liquid resins. One type of stereolithography system includes a containment vessel holding the curable resin, a movement mechanism coupled to a support tray, and a light engine. The stereolithography system forms a three dimensional (3D) article of manufacture by selectively curing layers of the photocurable resin onto a lower surface of the support tray. There is a desire to produce efficiently produce 3D articles having feature size tolerances that are less than 10 microns, less than five microns, or less than 2 microns in size. Various challenges to fabricating such small geometries include limitations on the optical and mechanical systems that are historically suitable for tolerances that are more in a range of 20 microns or larger.

SUMMARY

A first aspect of the disclosure is a method of manufacturing a three-dimensional (3D) article using a 3D printing system. The 3D printing system includes an elevator, a vertical movement mechanism, a build platform, and an imaging module. The elevator is configured for translation along a vertical axis and includes an elevator actuator. The vertical movement mechanism is coupled to the elevator. The build platform includes a build plate having a lower surface. The imaging module includes a light engine and a distance sensor. The method includes loading the build platform onto the elevator, operating the vertical movement mechanism to lower the lower surface of the build platform into a measurement range with the distance sensor, scanning the imaging module along at least one lateral axis, concurrent with scanning the distance sensor, receiving a signal from the distance sensor indicative of a plurality of vertical locations along the lateral axis of the lower surface of the build platform, computing an inclination of the lower surface of the build platform based upon the signal from the distance sensor, and operating the elevator actuator to level the lower surface of the build platform. The distance sensor can be a confocal distance sensor or a plurality of confocal distance sensors. Other distance sensors can be used such as a laser displacement sensor. The light engine can include one or a plurality of projection light engines.

Operating an actuator within an elevator to level the lower surface of the build platform enables more accurate imaging of the 3D article. In fact, this method of leveling enables dimensional tolerances that are an order of magnitude smaller than conventional 3D printing systems. The implementations listed infra further enable precision imaging.

In one implementation, the elevator includes (a) a lower support including the elevator actuator extending upward from an upper side of the lower support and (b) an upper support with a lower side including a datum surface engaged with the elevator actuator. The method includes operating the actuator to modulate an orientation of the upper support with respect to the lower support and with respect to a horizontal axis.

In another implementation the elevator includes a lower support and an upper support. The lower support has an upper side. The upper support includes a lower side including three datum surfaces. The lower support includes a pin and two elevator actuators that extend upward from the upper side and engage the three datum surfaces. Operating the two elevator actuators modulates an orientation of the upper support along two orthogonal axes.

In yet another implementation, the build platform includes a support plate having a lower surface and a plurality of vertical rods that couple the lower surface of the support plate to an upper surface of the build plate. Loading the build platform onto the elevator includes loading the lower surface of the support plate onto an upper surface of the elevator.

In a further implementation, elevator includes at least one electromagnet. The build platform includes a support plate having a lower surface and a plurality of vertical rods that couple the lower surface of the support plate to an upper surface of the build plate. Loading the build platform onto the elevator includes loading the lower surface of the support plate onto an upper surface of the elevator and activating the at least one electromagnet.

In a yet further implementation, the light engine includes a plurality of light engines. The method includes scanning and operating the plurality of light engines to image a layer of photocurable resin.

In another implementation, the 3D printing system includes a rigid base, a vertical beam extending upward from the rigid base, and a plurality of actuators extending upward from the rigid base. The method includes loading a build vessel onto the rigid base and engaging the plurality of actuators, scanning the imaging module along at least one lateral axis along a lower surface of the build vessel, concurrent with scanning the imaging module, receiving a signal from the distance sensor indicative of a plurality of vertical locations along the lateral axis of an internal surface of the build vessel, and operating the plurality of actuators to adjust a height of the lower surface of the build vessel. The internal surface of the build vessel can be an upper surface of a glass plate that supports a flexible, transparent sheet. The upper surface of the glass plate can provide a mechanical datum surface for the transparent sheet.

In a second aspect of the disclosure, a three-dimensional (3D) printing system is configured to print a 3D article in a layer-by-layer manner and includes a vertical beam, an elevator, and a build platform. The elevator is configured for vertical translation along the vertical beam and includes an upper support and a lower support. The lower support includes at least one elevator actuator extending upward from an upper side. The upper support has a lower side including a datum surface in engagement with the actuator. The elevator actuator is configured to vary a vertical height of the datum surface above the upper side of the lower actuator and to modulate an inclination of the upper side of the upper support. The build platform includes a build plate coupled below a support plate. The build plate has a lower side for formation of the 3D article. The support plate has a lower side that engages the upper side of the upper support of the elevator to support the build platform. The elevator actuator can include two elevator actuators configured to vary the vertical height of the upper support relative to the lower support with or without net rotation about one or two lateral axes X and Y. The two elevator actuators can individually adjust the inclination of the upper support around one of two lateral axes X or Y (theta-X or theta-Y). In combination, the two elevator actuators can adjust the inclination around the two lateral axes X and Y (theta-X and theta-Y).

Having an elevator with a lower and upper support—with the upper support inclination modulated by the elevator actuator—enables mechanical compensation for machine tolerances and/or fluidic drag. The elevator (and other parts of the 3D printing system) are configured to ensure a uniform layer of resin between a build plate and a transparent sheet. The uniformity enables production of 3D articles having dimensional tolerances that can be less than 10 microns, less than 5 microns, less than two microns or even less than one micron. Pixel or voxels having vertical steps smaller than 10 microns, or less than or equal to 5 microns can be defined.

In one implementation the 3D printing system includes a controller which includes a processor coupled to a storage device. The storage device stores software instructions that when executed by the processor allow the controller to operate portions and elements of the 3D printing system. This includes operation of the elevator actuator to modulate a height and inclination of the upper support of the elevator which in turn can lower or level the lower side of the build plate to coincide with a horizontal plane. This enables lowering a lower side of a build platform to be less than 10 microns or about five microns from a transparent sheet. Thus, layer thicknesses and pixel sizes of about five microns are enabled.

In another implementation, the elevator includes a force sensor that is configured to output a signal indicative of a force exerted upon the elevator by the platform. The 3D printing system includes a controller that is configured to analyze the signal and to determine a vertical positional error for the build plate when the lower surface of the build plate is moved to the build plane. The controller is configured to respond to the vertical positional error by vertically translating the build plate by a distance of less than 20 microns. The controller can also determine an angular tilt or inclination error of the lower side of the build plate. The controller is configured to respond to the determination by operating the actuator to compensate for the error and to vertically translate and/or level the lower side of the build plate.

In yet another implementation, the 3D printing system includes a distance sensor and a controller. The controller is configured to operate the distance sensor to scan the lower side of the build plate and to receive a signal from the sensor during the scanning. The controller is configured to analyze the signal and to determine a vertical position error and/or an angular tilt or inclination error of the lower side of the build plate. The controller is configured to respond to the determination by operating the actuator to compensate for the error and to vertically translate and/or level the lower side of the build plate.

In a further implementation, the 3D printing system includes a controller, a rigid base, an imaging module, a plurality of base actuators extending upward from the rigid base, and a build vessel. When the build vessel is placed upon the rigid base it is engaged by the plurality of base actuators. The controller is configured to scan a lower surface of the build vessel with the imaging module. The imaging module outputs a signal indicative of a height of points upon the lower surface of the build vessel being scanned. The controller is configured to determine a height and/or inclination error of the lower surface of the build vessel and to operate the plurality of base actuators to correct the height and/or inclination error. The plurality of base actuators can include three base actuators to allow both a height error to be corrected along a vertical axis Z and to allow inclinations errors to be corrected along two axes theta-X and theta-Y.

In a yet further implementation, the lower support of the elevator includes an upward extending pin and the elevator actuator includes two elevator actuators. The upper support includes three datums having datum surfaces arranged and configured to engage the pin and the two elevator actuators. The two elevator actuators are configured to adjust a height or an inclination or tilt of the upper support of the elevator about the pin and about two lateral axes theta-X and theta-Y.

A third aspect of the disclosure is a method of manufacturing a three-dimensional (3D) article using a 3D printing system. The 3D printing system includes a rigid base, a vertical beam extending above the rigid base, an elevator configured for vertical translation along the vertical beam, the elevator containing an elevator actuator and a force sensor, a vertical movement mechanism coupled to the elevator, a build platform including a build plate having a lower surface, a build vessel containing photocurable resin and having a lower side with a transparent sheet, an imaging module, and a controller. The method includes loading the build platform onto the elevator, operating the vertical movement mechanism to translate the lower surface of the build plate through the resin to a build plane, the photocurable resin exerting a force upon the elevator that translates and/or rotates lower surface of the build plate away from the build plane, receiving a signal from the force sensor, operating the controller to compute a force-induced positional discrepancy between the lower surface of the build plate and the build plane based upon the signal from the force sensor, and operating the elevator actuator to compensate for the positional discrepancy. The force exerted on the elevator can have an element of torque. The compensation for the positional discrepancy can include both a vertical displacement and a rotational component.

The 3D printing system is fabricated from thick and rigid materials such as tool steel and granite plates. However, the fluid drag of translating the lower surface of the build plate through the photocurable resin to the build plane is enough to cause a vertical and/or angular deflection that makes it difficult to precisely position the lower surface of the build plate at the build plane and this in turn limits resolution of the machine to no better than 10 or 20 micron layer thicknesses. Operating the actuator to offset the deflection enables a closer approach to the build plane that enables layer thicknesses below 10 microns, or as thin as 5 microns or even thinner.

In one implementation, the elevator includes a lower support further including the elevator actuator extending upward from an upper side of the lower support and an upper support with a lower side including a datum surface engaged to the elevator actuator. The method includes operating the elevator actuator to modulate an orientation of the upper support with respect to the lower support and with respect to the horizontal plane. The lower support can include a pin that extends upward from the upper side of the lower support. The lower side of the upper support can include a datum that engages and self-centers upon the pin. Operating the elevator actuator can rotate the upper support about the pin. The force sensor can be a load cell that is coupled between the pin and the lower support. Receiving the signal from the sensor can be receiving a signal from the load cell that is indicative of a force of the pin datum against the pin. The elevator actuator can include two elevator actuators. Operating the elevator actuator can include selectively rotating the upper support with respect to two lateral axes. The lower support can include a proximal portion that is slidingly coupled to the vertical beam and a distal portion that extends along a lateral axis X away from the vertical beam. The pin can be located on the distal portion. The two elevator actuators can be located on the proximal portion on opposing sides of the vertical beam with respect to a second lateral axis Y. Operation of the two elevator actuators can selectively raise, lower, and/or rotate the proximal portion with respect to the distal portion. Lateral axes X and Y are perpendicular to each other and generally horizontal.

In another implementation, the elevator includes an electromagnet. Loading the build platform onto the elevator includes energizing the at least one electromagnet. The electromagnet further assures that the system can overcome the fluid drag and pressure of the photocurable resin upon the build plate. The electromagnet can include three electromagnets arranged about the pin to define an equilateral triangle about the pin.

In yet another implementation, the method includes operating the imaging module to selectively harden a layer of the photocurable resin at the build plane.

In a further implementation, the build platform includes a support plate coupled to and above the build plate. A plurality of vertical rods couple the support plate to the build plate. Loading the build platform onto the elevator includes loading the support plate onto the elevator.

DETAILED DESCRIPTION OF THE PREFERRED EMBODIMENTS

Figure 1:
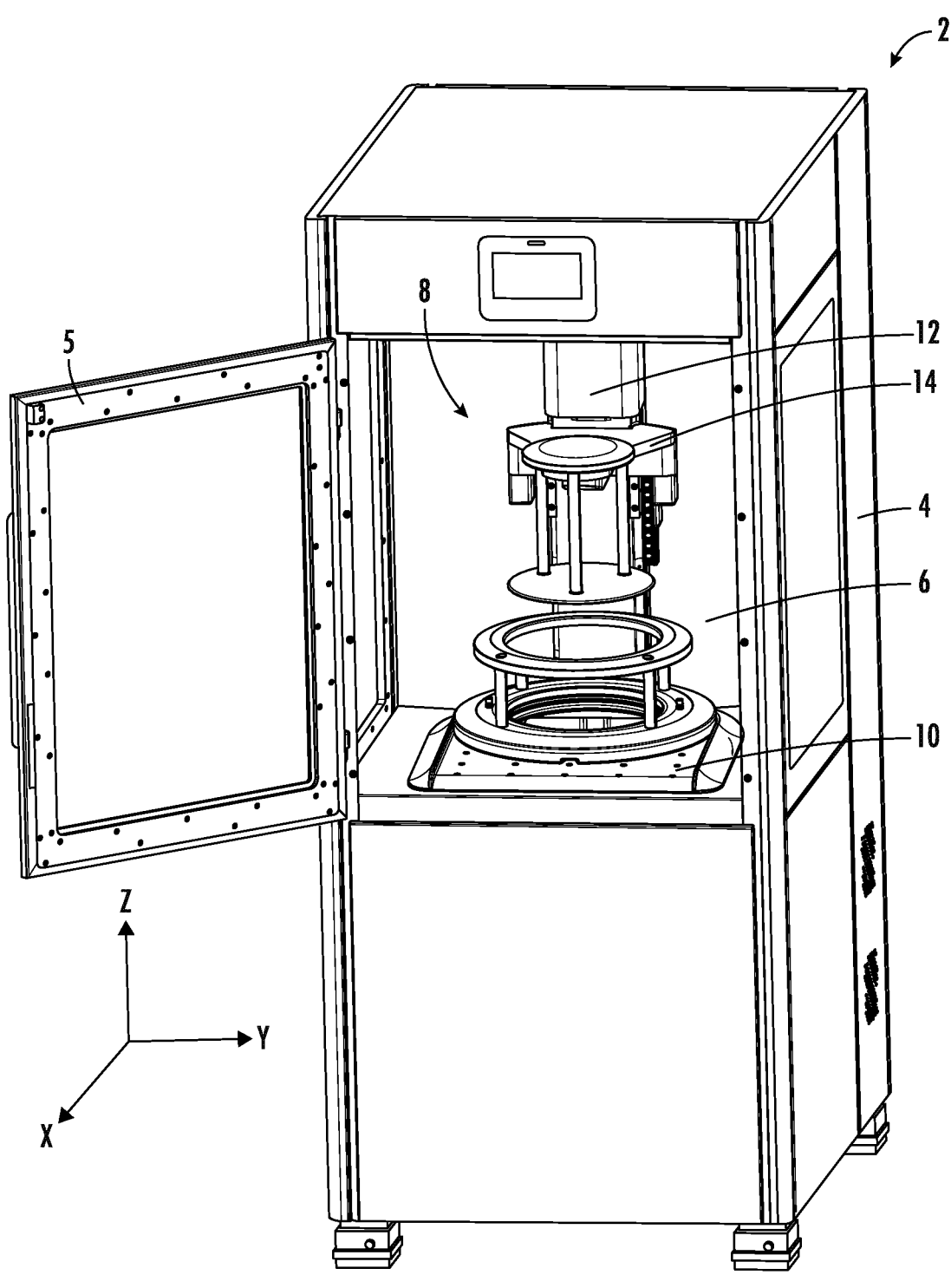
FIG. 1 is an isometric drawing depicting an embodiment of a three-dimensional (3D) printing system.

FIG. 1 is an isometric drawing depicting an embodiment of three-dimensional (3D) printing system 2. In describing 3D system 2, mutually perpendicular axes X, Y, and Z will be used. Axes X and Y are generally horizontal lateral axes. Axis Z is a vertical axis that is generally aligned with a gravitational reference. In using the word "generally" it is implied that a limitation that is "generally" true is by design but to within manufacturing tolerances. Additionally angular axes theta-X, theta-Y, and theta-Z are rotations about the X, Y, and Z axes respectively. 3D printing system 2 includes an outer housing 4 that contains an internal chamber 6 containing a print engine 8. A door 5 is provided on housing 4 to allow access to a closure of the internal chamber 6.

Figure 2:
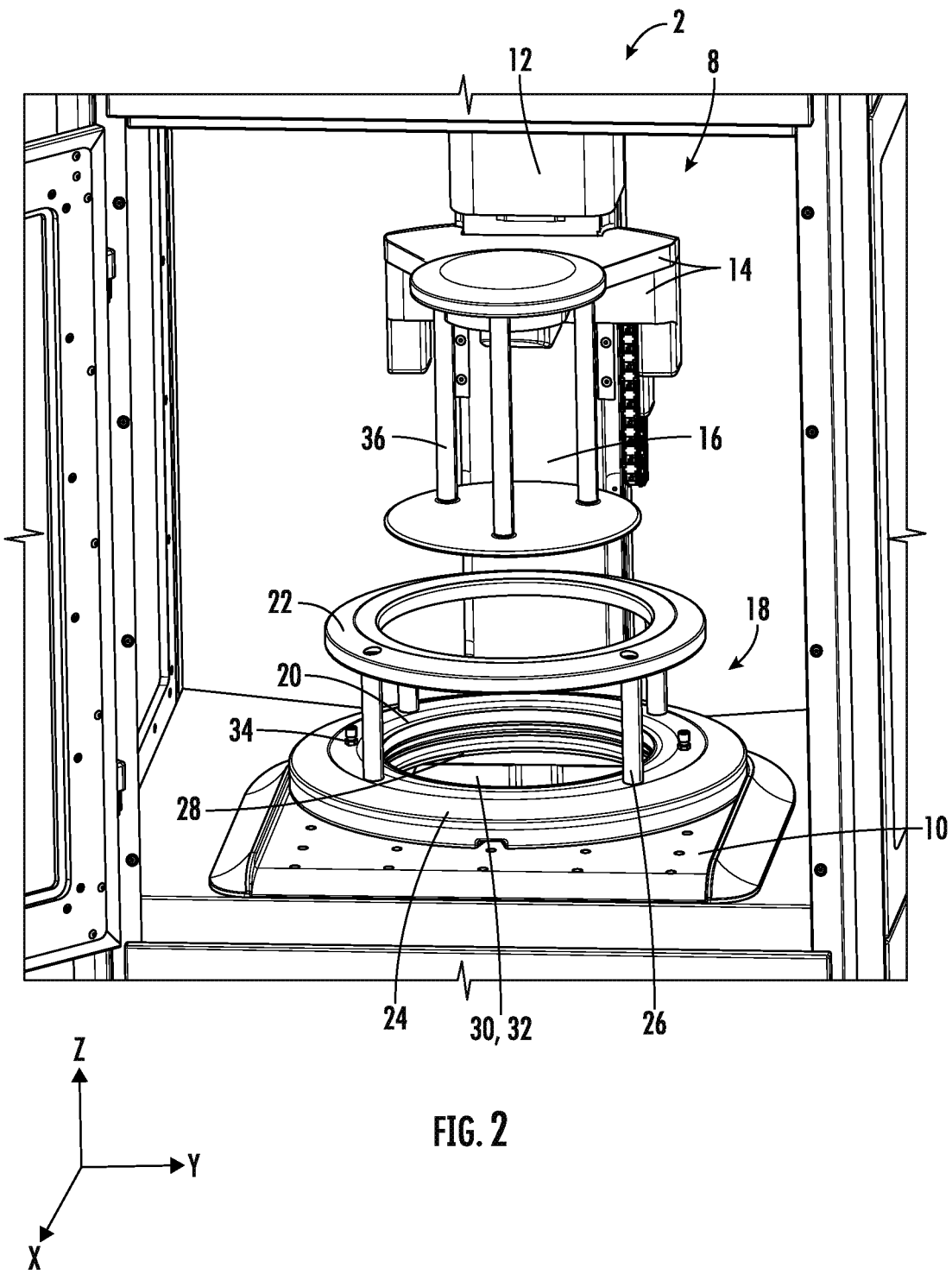
FIG. 2 is an isometric drawing depicting an embodiment of a 3D print engine.

FIGS. 2-5 are isometric drawings that provide further details of the print engine 8. Referring to FIG. 2, the print engine 8 includes a rigid base 10 and a vertical beam 12 extending upward from the rigid base 10. An elevator 14 is slidingly coupled to the vertical beam 12 and is configured for vertical translation along the vertical beam 12. A vertical movement mechanism 16 (not shown here in detail) is coupled to the vertical beam 12 and the elevator 14 and is configured to controllably, selectively, vertically, and accurately translate and position the elevator 14 along the vertical beam 12.

An embodiment of vertical movement mechanism 16 includes a motorized ball bearing screw mechanism or otherwise referred to as a ball screw mechanism. A ball screw mechanism includes a vertical screw shaft that passes through a ball nut. The ball nut contains recirculating steel balls and translates vertically. The vertical screw shaft has helical channels that engage the recirculating balls. The elevator 14 includes the ball nut. A motor is coupled to the vertical screw shaft and is configured to selectively rotate the vertical screw shaft. As the vertical screw shaft rotates, the action of the vertical screw shaft upon the ball nut translates the elevator upward and downward depending on a direction of rotation. Such translation mechanisms are known in the art for precision positioning along vertical, horizontal, and oblique axes. Other embodiments are possible such as a lead screw and nut system or a rack and pinion mechanism or a motorized belt/pulley system and are all known in the art for linearly translating components along various axes.

The elevator 14 is slidingly coupled to the vertical beam 12 by a linear bearing. The linear bearing has a combination of a race and ball bearings for low friction and linear movement. Other bearing designs are possible and linear bearings are known in the art for precision linear motion constraint.

Print engine 8 includes a build vessel 18 containing photocurable resin 20. Build vessel 18 includes an upper ring 22 coupled to a lower ring 24 by vertical rods 26. The photocurable resin 20 is contained within build vessel 18 by an outer cylindrical vertical wall 28 and a lower circular transparent sheet 30 supported by a circular glass plate 32. At least one gas port 34 allows oxygenated gas or atmospheric gas to enter and exit from a space between the transparent sheet 30 and the circular glass plate 32.

Figure 3:
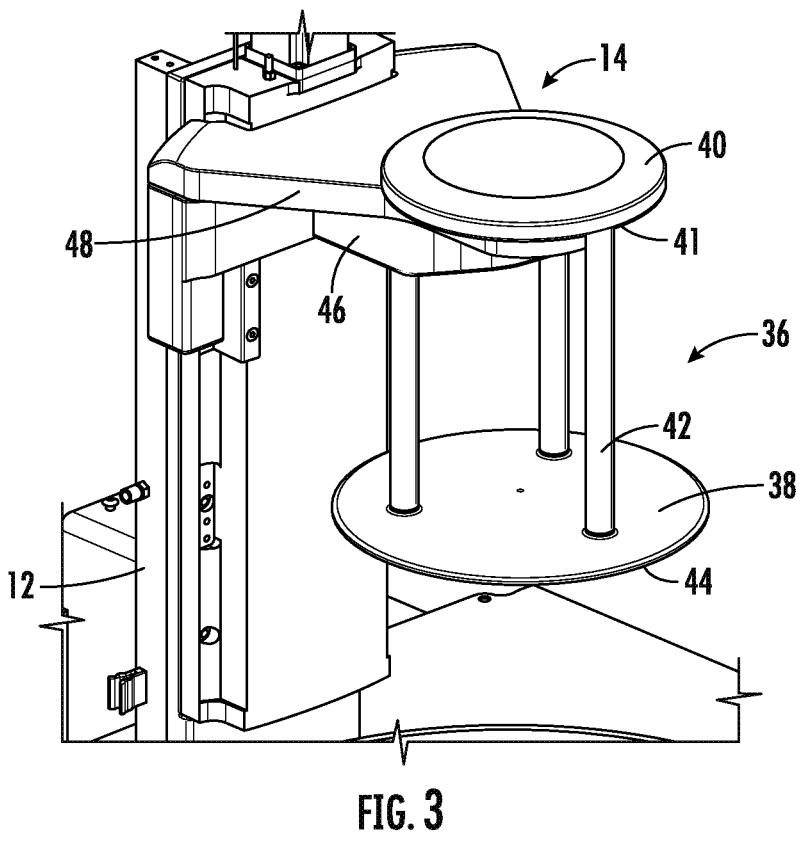
FIG. 3 is an isometric drawing depicting portions of the 3D print engine of FIG. 2.

Print engine 8 also includes a build platform 36 supported by the elevator 14. Referring to FIG. 3, build platform 36 includes a build plate 38 coupled to a support plate 40 via a plurality of vertical rods 42. Support plate 40 has a lower surface 41. Build plate 38 has a lower surface 44 for supporting a 3D article (not shown) that is being manufactured by 3D printing system 2. The elevator 14 includes a lower support 46 that supports an upper support 48. The support plate 40 is supported over the upper support 48 of the elevator.

Figure 4:
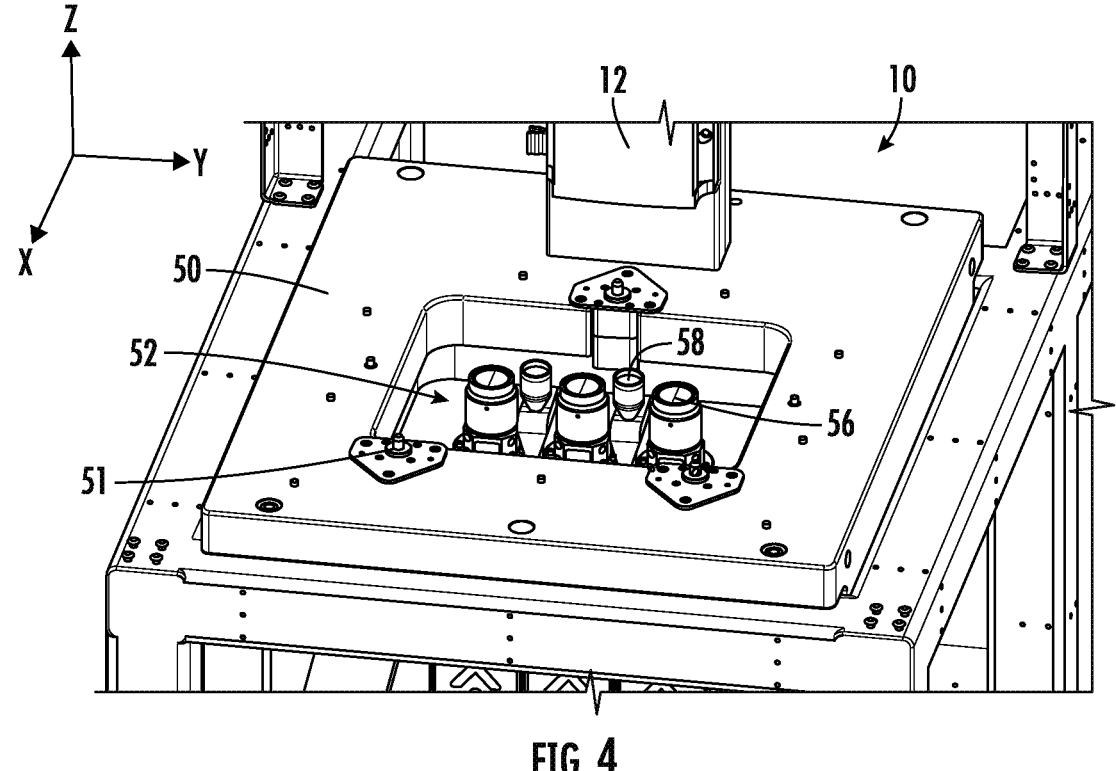
FIG. 4 is an isometric drawing depicting a portion of the 3D print engine of FIG. 2 with emphasis on a rigid base supporting an imaging module.
Figure 5:
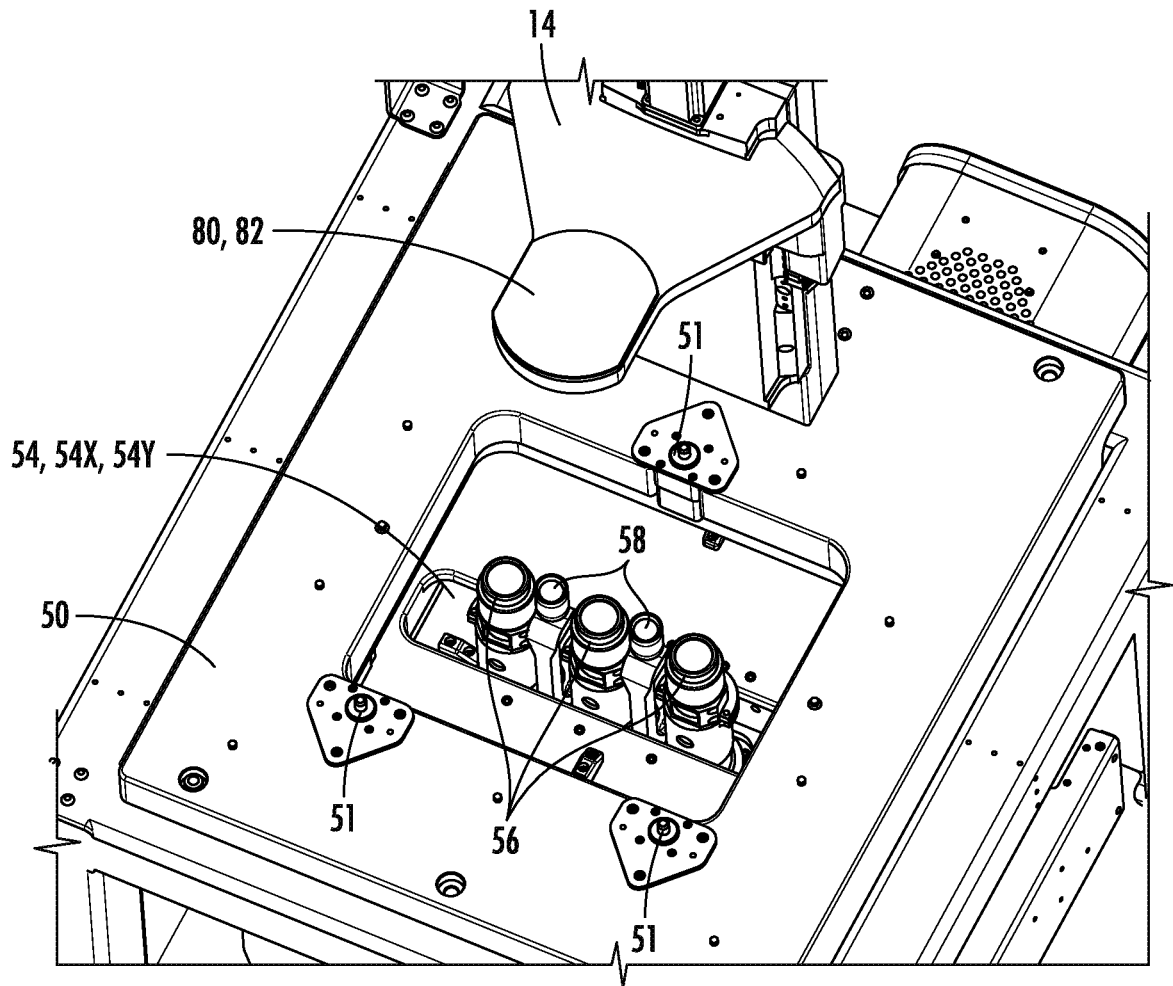
FIG. 5 is an isometric drawing depicting a portion of the 3D print engine of FIG. 2 with emphasis on a rigid base supporting an imaging module.

FIGS. 4 and 5 are isometric drawings that illustrate details around the rigid base 10 of system 2. Rigid base 10 includes a granite plate 50 which provides stable support for mechanical and optical components of print engine 8. The granite plate 50 supports three base actuators 51 which are configured to engage a lower side of the lower ring 24 of the build vessel (FIG. 2) when the build vessel is loaded onto the rigid base 10. Also coupled to the granite plate 50 is an imaging module 52.

Imaging module 52 is configured to be translated along both lateral axes X and Y. Translation along the two axes is provided by a two dimensional (2D) movement mechanism 54. In one embodiment, the movement mechanism 54 includes two movement mechanisms 54X, 54Y that can be similar to the vertical movement mechanism 16 described with respect to FIG. 2. In the illustrated embodiment, the movement mechanism 54 includes linear motors that drive screw or gear mechanisms. The movement mechanisms 54X, 54Y are configured to selectively position and translate the imaging module 52 along the lateral X and Y axes respectively. Other precision movement mechanisms 54 are possible and such are known in the art for precision mechanisms that are used to image 3D printing, 2D printing, and circuit photolithography.

In the illustrated embodiment, the imaging module 52 includes three light engines 56. Light engines 56 are individually projection-based light engines that are known in the art for stereolithography of photocurable resins. Such a light engine includes a light source, a spatial light modulator, projection optics, and other optical components (bending lenses or mirrors, converging and diverging lenses or mirrors, to name a few).

Interleaved between the light engines are two confocal distance sensors 58. The confocal distance sensors are non-contact distance sensors that are configured for sensing a distance and/or height of a surface of the build plate 38, transparent sheet 30, and/or glass plate 32. Confocal distance sensors 58 can be configured to utilize monochromatic or polychromatic light and are well known in the art for high accuracy distance measurements.

The use of other known distance sensors 58 is possible. Alternatively, the distance sensors can be based upon lasers.

Some direct a beam at a small oblique angle relative to a surface normal and receive the beam with a line of sensors. The principle of triangulation is used to determine distance. Extremely accurate sensors utilize a principle of interferometry. Such sensors are known in the art and are widely available.

Figure 6:
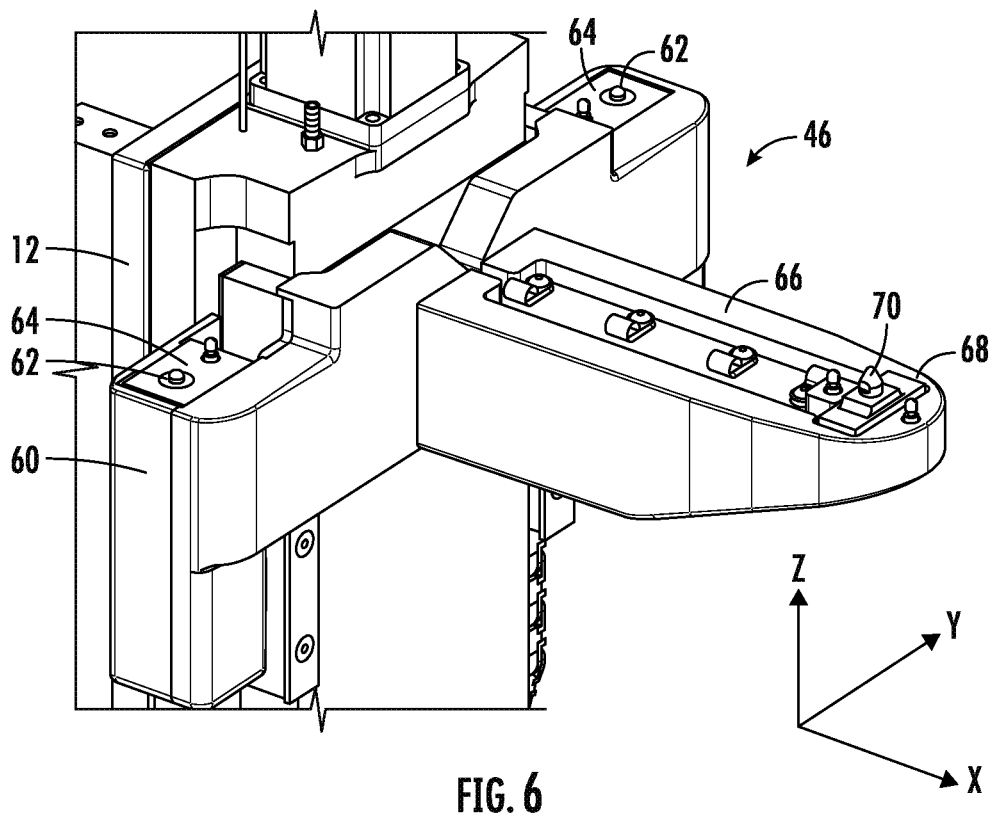
FIG. 6 is an isometric drawing depicting a portion of the 3D print engine of FIG. 2 with emphasis on a lower support of an elevator.

FIG. 6 is an isometric drawing view of the lower support 46 of elevator 14. The lower support 46 includes a proximal portion 60 slidingly coupled to the vertical support 12. The proximal portion 60 has a major axis along second lateral axis Y and has two elevator actuators 62 located at opposing ends of the proximal portion 60 with respect to Y. The two elevator actuators 62 are laterally located on opposing sides of the vertical support 12 with respect to second lateral axis Y and individually extend upward from an upper surface 64 of the proximal portion 60. Elevator actuators 62 are spaced apart with respect to second lateral axis Y. Elevator actuators 62 individually have spherical tips at an upper end.

The elevator actuators 62 are configured to be selectively raised and lowered vertically along vertical axis Z. In one embodiment, the elevator actuators 62 can be individually coupled to a motorized lead screw. The lead screw is threaded into a motorized nut. When a motor turns the nut, it has the effect of selectively raising and lowering the elevator actuator 62. Vertical actuators such as the illustrated elevator actuators 62 are known in the art for extremely accurate vertical movement. Lead screw implementations typically have very fine screw threads.

Lower support 46 includes a distal portion 66 that extends along first lateral axis X from the proximal portion 60 to a distal end 68. Extending upward from the distal end 68 is a pin 70. The pin 70 has a rounded or spherical tip at an upper end.

Figure 7:
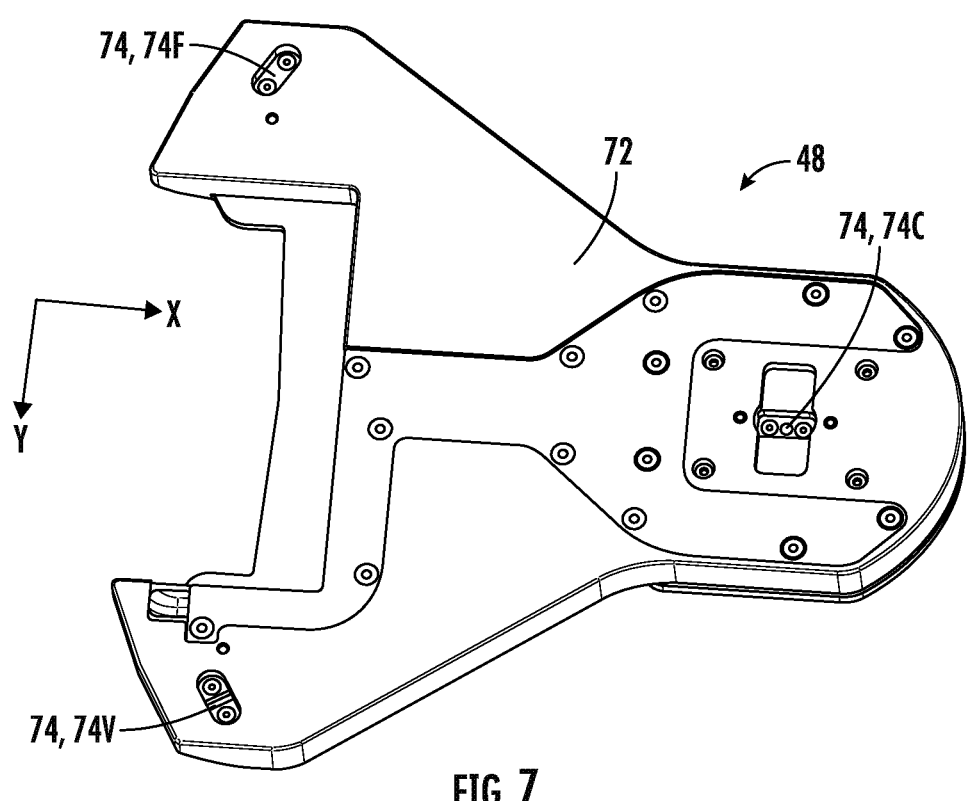
FIG. 7 is an isometric drawing depicting a portion of the 3D print engine of FIG. 2 with emphasis on an upper support of an elevator.

FIG. 7 is an isometric view of a lower side 72 of the upper support 48 of elevator 14. The lower side 72 has three datums 74 including a flat datum 74F, a V-datum 74V, and a conical datum 74C. The V-datum 74V defines a V-shaped recess geometry. The conical datum 74C defines a conical recess. When the upper support 48 is loaded onto the lower support 46, the lower side 72 faces the lower support 46. The spherical tips of the pair of two actuators 62 individually engage two of the datums 74 including the flat datum 74F and the V-datum 74V. The spherical tip of pin 70 engages the conical datum 74C.

Figure 8:
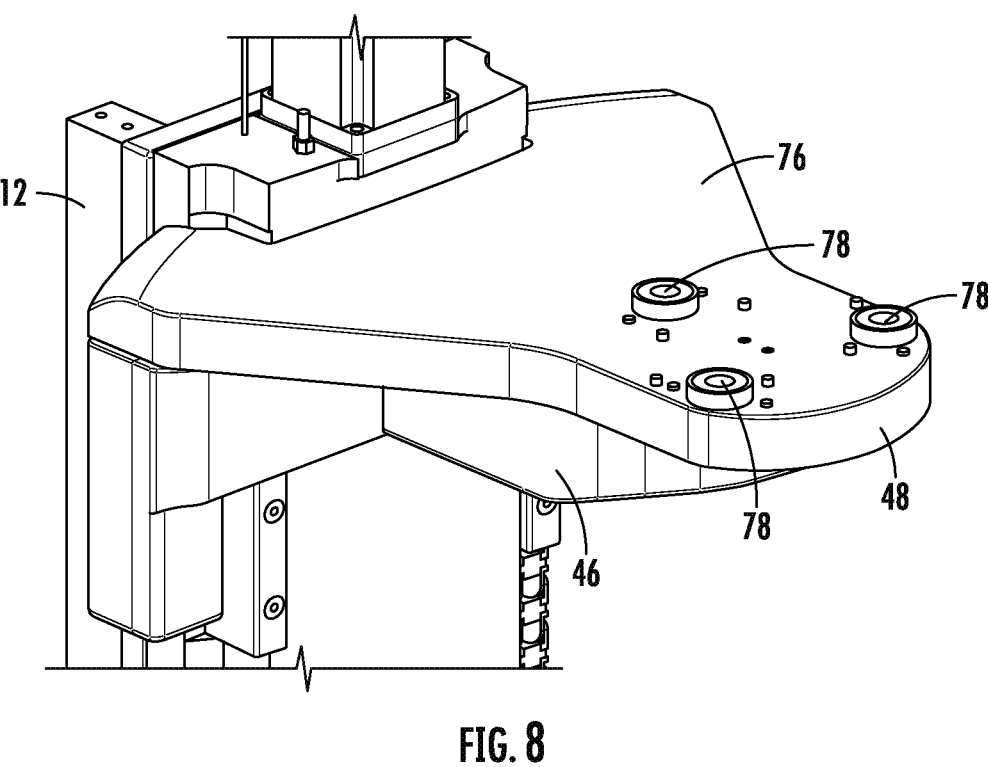
FIG. 8 is an isometric drawing of a portion of the 3D print engine of FIG. 2 with emphasis on an elevator and electromagnets for securing a build platform.
Figure 9:
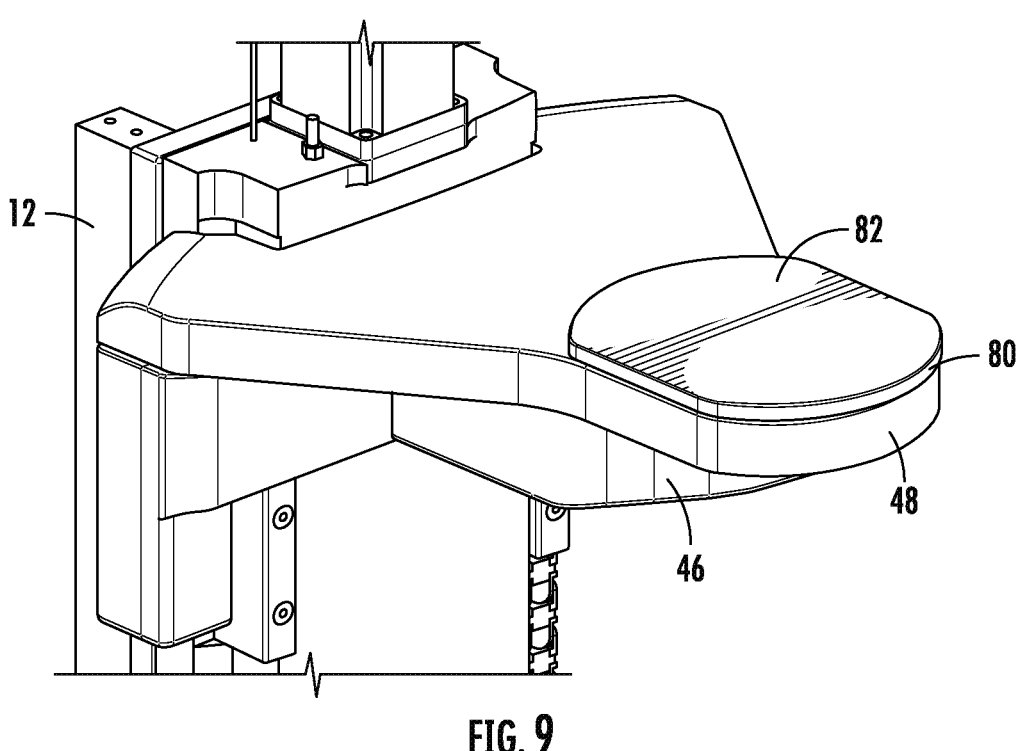
FIG. 9 is an isometric drawing that is similar to FIG. 8 except that a cover is placed over the electromagnets.

FIG. 8 is an isometric view of the elevator 14 slidingly coupled to the vertical support 12 including the upper support 48 supported by the lower support 46. An upper side 76 of the upper support 48 includes a plurality of three electromagnets 78 which extend upward from the upper side 76. FIG. 9 is similar to FIG. 8 except that a cover 80 is placed over part of the upper surface 76 and the three electromagnets 78. Cover 80 is formed from a ferromagnetic material. Cover 80 has an upper surface 82 that forms part of an upper surface of the upper support 48 when the cover 80 is in place over the electromagnets 78. When build platform 36 is loaded onto elevator 14, the lower surface 41 of support plate 40 is loaded onto the upper surface 82.

Figure 10:
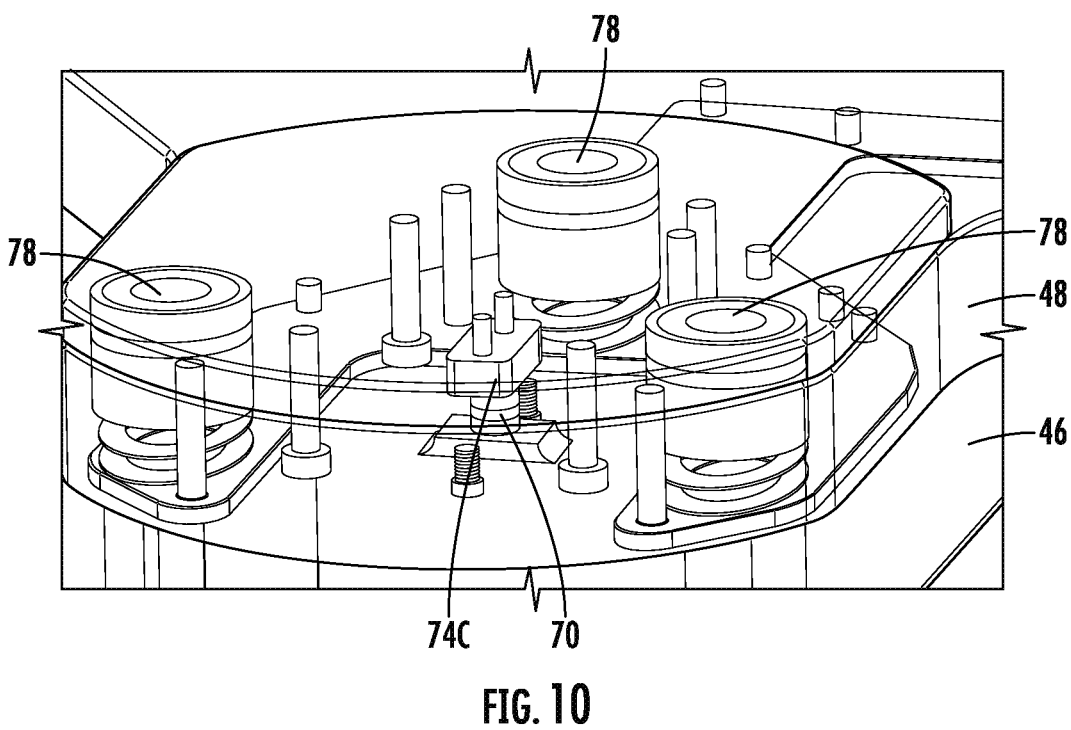
FIG. 10 is an isometric drawing of a portion of an elevator with part of the upper support in ghost to allow underlying portions to be visible.

FIG. 10 is an isometric view. Compared to FIG. 9 orientation has changed and portions of the upper support 48 are shown in "ghost" which is with a degree of transparency to allow viewing of parts within or underneath. The pin 70 and conical datum 74C are at a center of an equilateral triangle defined by the centers of the (circular) electromagnets 78. Coupling the upper support 48 onto lower support 46 electrically couples the electromagnets 78 and a force sensor 86 (to be discussed) of the upper support 48 to the print engine 8 (FIGS. 1 and 2). The electromagnets 78 and force sensor 86 are components of the lower support 46.

The upper support 48 is also mechanically coupled to the lower support 46 by a combination of springs and shoulder bolts (not shown) which are located near the two actuators 62 and the spherical pin 70. The springs and shoulder bolts spring load the datums 74 onto the spherical tips of the actuators 62 and pin 70.

Figure 11:
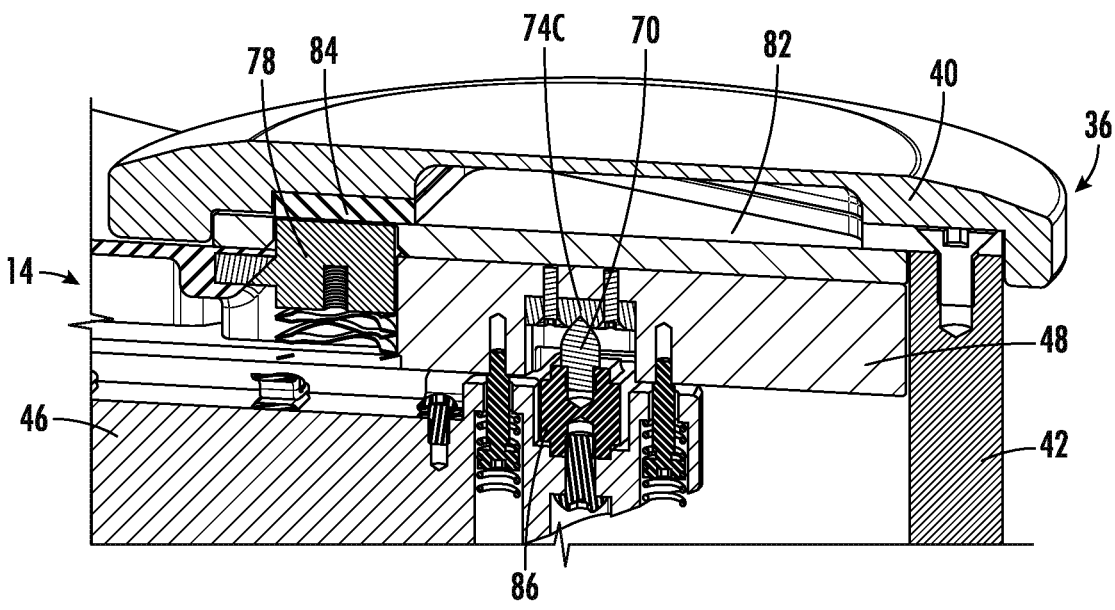
FIG. 11 is an isometric cutaway view of an elevator supporting a support plate of a build platform.

FIG. 11 is a cutaway isometric view showing details of portions of the build platform 36 loaded onto the elevator 14. The support plate 40 of build platform 36 is loaded onto the upper surface 82 of the upper support 48. The support plate 40 includes an internal magnetic or ferromagnetic plate 84 that overlays the three electromagnets 78 when the support plate 40 is loaded onto the upper support 48 of elevator 14.

The lower support 46 includes a load cell 86 under the pin 70. The pin 70 is centered upon and threaded into the load cell 86. Load cell 86 is a force sensor that outputs a voltage that is indicative of a vertical force exerted by the conical datum 74C upon the pin 70. A linear factor driving the vertical force upon force sensor 86 is a force upon the build plate 38 that is transmitted to the support plate 40 by the vertical rods 42. Thus, force sensor 86 outputs a varying signal that is modulated by variations in force upon the build plate 38.

Figure 12:
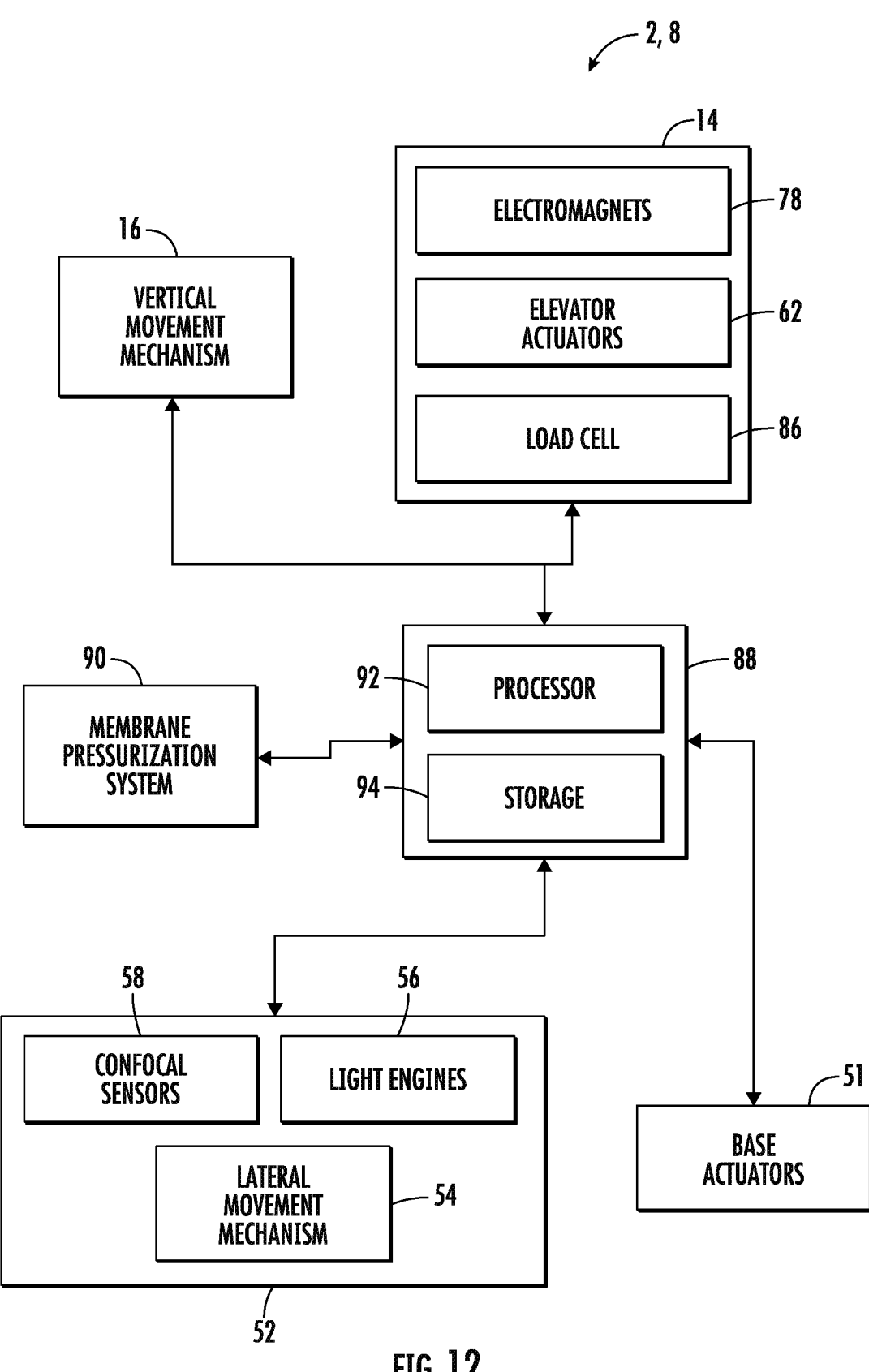
FIG. 12 is a simplified electrical block diagram of an embodiment of a 3D printing system.

FIG. 12 is simplified electrical block diagram of the 3D printing system 2 which includes print engine 8. FIG. 12 is simplified in the sense that certain features of print engine 8 may be left out for simplicity. A controller 88 is electrically and controllably coupled to components of elevator 14, vertical movement mechanism 16, base actuators 51, imaging module 52, and membrane pressurization system 90.

Controller 88 includes a processor 92 coupled to an information storage subsystem 94 including non-transient or nonvolatile information storage devices. The information storage 94 stores software instructions that, when executed by the processor 92, operate portions of the print engine 8 including various systems and subsystems shown in FIG. 12. The controller 88 can be a single module co-located with the print engine 8 and/or include modules, computers, and/or servers that are spaced or remote from print engine 8. Controllers including processors and storage subsystems are well known in the art for control of electromechanical systems.

Figure 13:
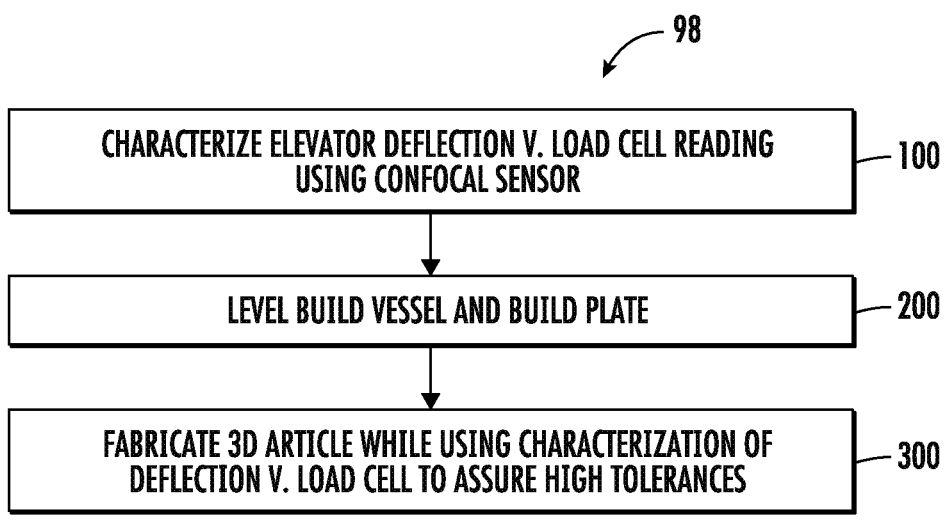
FIG. 13 is an embodiment of a "high level method" of manufacturing a 3D article.

FIG. 13 is a "high level method" 98 of manufacturing a 3D article using 3D printing system 2. Methods or major steps 100, 200, and 300 may be performed at one time prior to and during fabrication of the 3D article. Alternatively these methods may be performed at separate times but are each and in combination portions of an overall method 98 for manufacturing the 3D article. Portions or all of method 98 can be performed by controller 88. Some methods of manufacturing may be manual as well.

Figure 14:
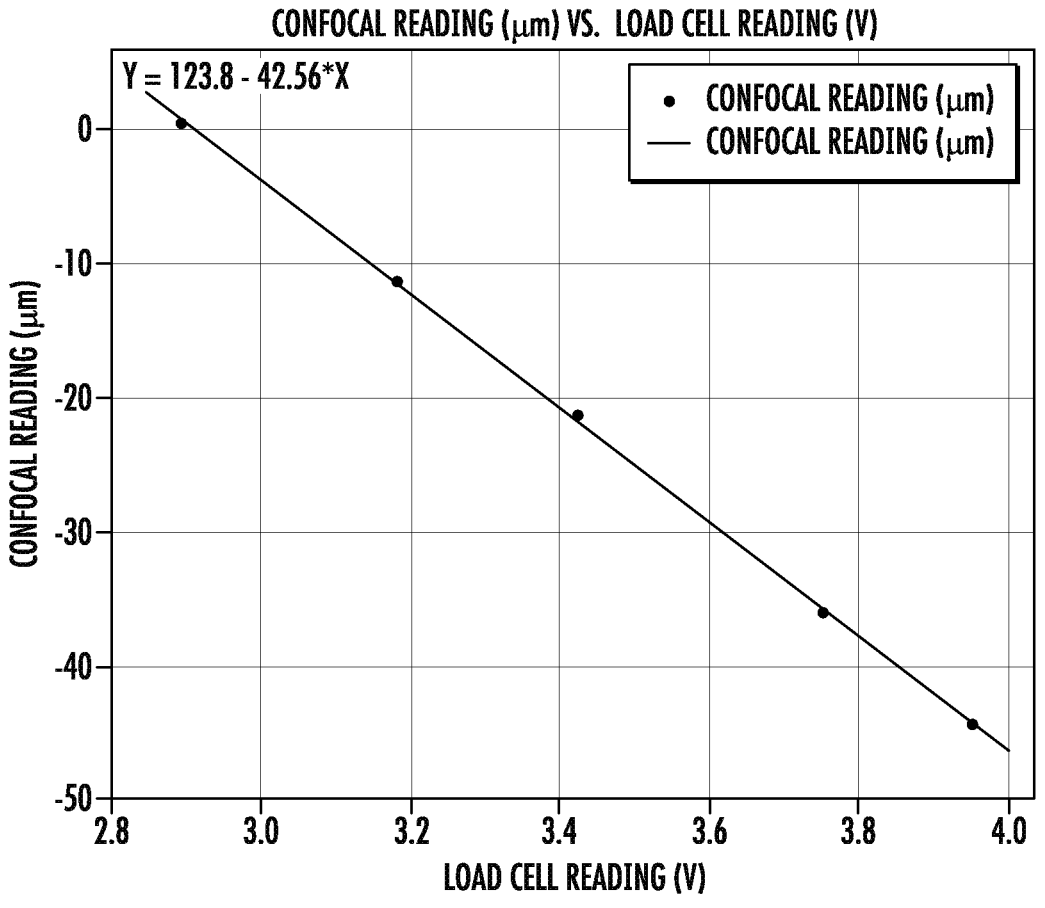
FIG. 14 is a graphical illustration illustrating a correlation between a distance sensor reading (indicating a height of a point on an elevator or build platform) versus a force sensor or load cell reading (indicating a force being sensed in the elevator).

According to 100, the confocal sensors 58 are used to measure deflection of a point (or line or area) on the build platform 36 versus a load cell reading. One way to do this to load the platform 36 onto the elevator 14 and then operate the vertical movement mechanism 16 to position the lower surface 44 of the build plate into a measurable range of a confocal sensor 58. At that point, the height of the lower surface 44 (from the confocal sensor 58) and voltage reading 86 are obtained and plotted on a graph. This is repeated after varying vertical forces are applied to the lower surface 44. An example resultant graph is illustrated in FIG. 14. From this graph, a deflected height of the lower surface 44 from an unstressed state can be inferred from the load cell reading.

According to 200, the confocal sensors 58 and actuators 51 and 62 are used to level the build vessel 18 and the lower surface 44 of the build plate 38 respectively. Leveling build vessel 18 can be performed before or after leveling the build plate 38.

According to 300, a 3D article is fabricated. During fabrication, a voltage from the load cell 86 is monitored, analyzed, and utilized to adjust a position of the lower surface 44 using the elevator actuators 62. The positional adjustment can include vertical translational and/or a rotational adjustment.

Figure 15:
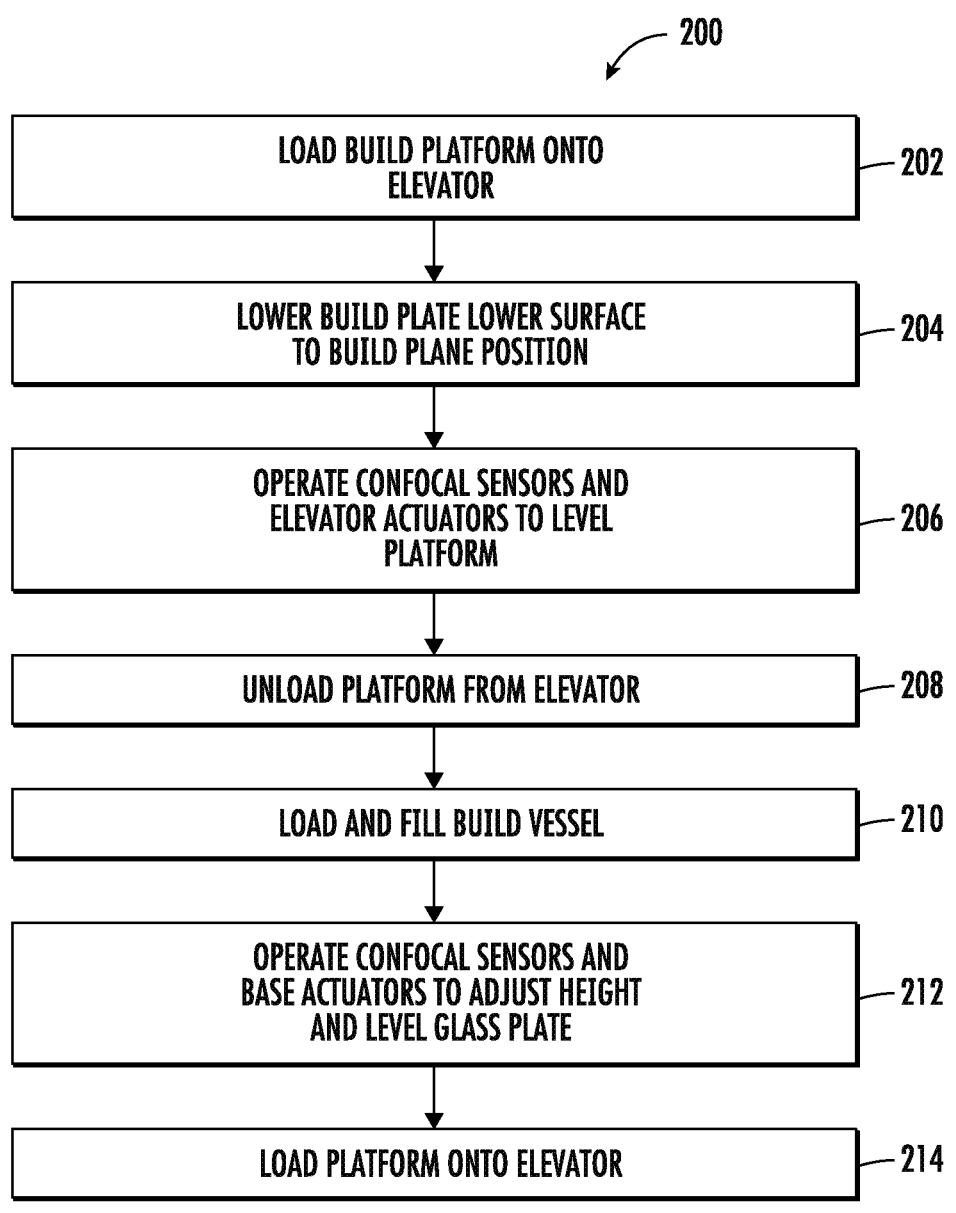
FIG. 15 is a flowchart depicting a method of calibration that is a portion of the method of FIG. 13.

FIG. 15 is a flowchart depicting an embodiment of method 200 in more detail. According to 202, the build platform 36 is loaded onto the elevator 14 by loading the lower surface 41 of support plate 40 upon the upper surface 82 of elevator 14. As part of loading the platform 36, the electromagnets 78 can be energized to magnetically secure the support plate 40 to the upper support 48.

According to 204, the vertical movement mechanism 16 is operated to move the lower surface 44 of build plate 38 to a "build plane" position. At the build plane position, the lower surface 44 is essentially at a focal distance of the light engines 56 and is within measurement range of the confocal distance sensors 58.

According to 206, the confocal sensors 58 and the elevator actuators are operated to level the lower surface 44. More particularly, 206 includes the following "minor" steps: (1) Operating the lateral movement mechanism 54 to scan the imaging module 52 with the confocal sensors 58 along the lower surface 44. (2) Concurrently with the scanning (1), the confocal sensors 58 are operated and output a signal indicative of a vertical height of points on the surface 44. (3) Based on the signal, an inclination and height error of the surface 44 is computed. (4) The elevator actuators are then operated to level the surface 44 to be coincident with a build plane defined by lateral XY motion of the lateral movement mechanism 54. Steps (1)-(4) can be repeated as needed until the surface 44 is parallel to the lateral XY motion of the lateral movement mechanism 54. The lateral XY motion is generally horizontal.

Regarding minor step (4)—above—of step 206, the actuators can be operated to adjust an inclination or orientation of the lower surface 44 with respect to the lateral X or Y axis. Reviewing FIG. 6, it is noted that vertically moving actuators 62 has the effect of rotating the upper support 48 about the pin 70. When both actuators 62 are raised or lowered in unison, the rotation is in theta-Y about the lateral Y-axis. If the two actuators 62 are moved in opposition (one actuator moving up while the other moves down by the same magnitude) the effect is rotation in theta-X about the lateral X-axis. In this way, any inclination of the lower surface 44 with respect to a horizontal plane (or the plane of the lateral XY motion of the lateral movement mechanism 54) can be canceled out by rotation along both lateral axes.

According to 208, the platform 36 is unloaded from the elevator 14. According to step 210, the build vessel 18 is loaded onto the rigid base 10 and filled with photocurable resin 20. When the build vessel 18 is loaded onto the rigid base 10 the lower ring 24 is placed over and into engagement with the base actuators 51. A upper surface of glass plate 32 is then within measurement range of the confocal distance sensors 58. The upper surface of the glass plate 32 is a datum plane that the transparent sheet 30 rests upon.

According to 212, the confocal sensors 58 and the base actuators are operated to level the glass plate 32 in a manner similar to that of step 206. Thus, step 212 has a similar set of four minor steps (1)-(4) for the upper surface of the glass plate 32. For step (4), three base actuators 51 are operated to move the upper surface of the glass plate 32 to a proper height as well as to level the glass plate 32.

According to 214, the build platform 36 is loaded onto elevator 14 in a manner similar to that of step 202. At this point, the print engine 8 is ready to proceed to method 300. In various embodiments, the ordering of the steps and minor steps of method 200 can vary.

Figure 16:
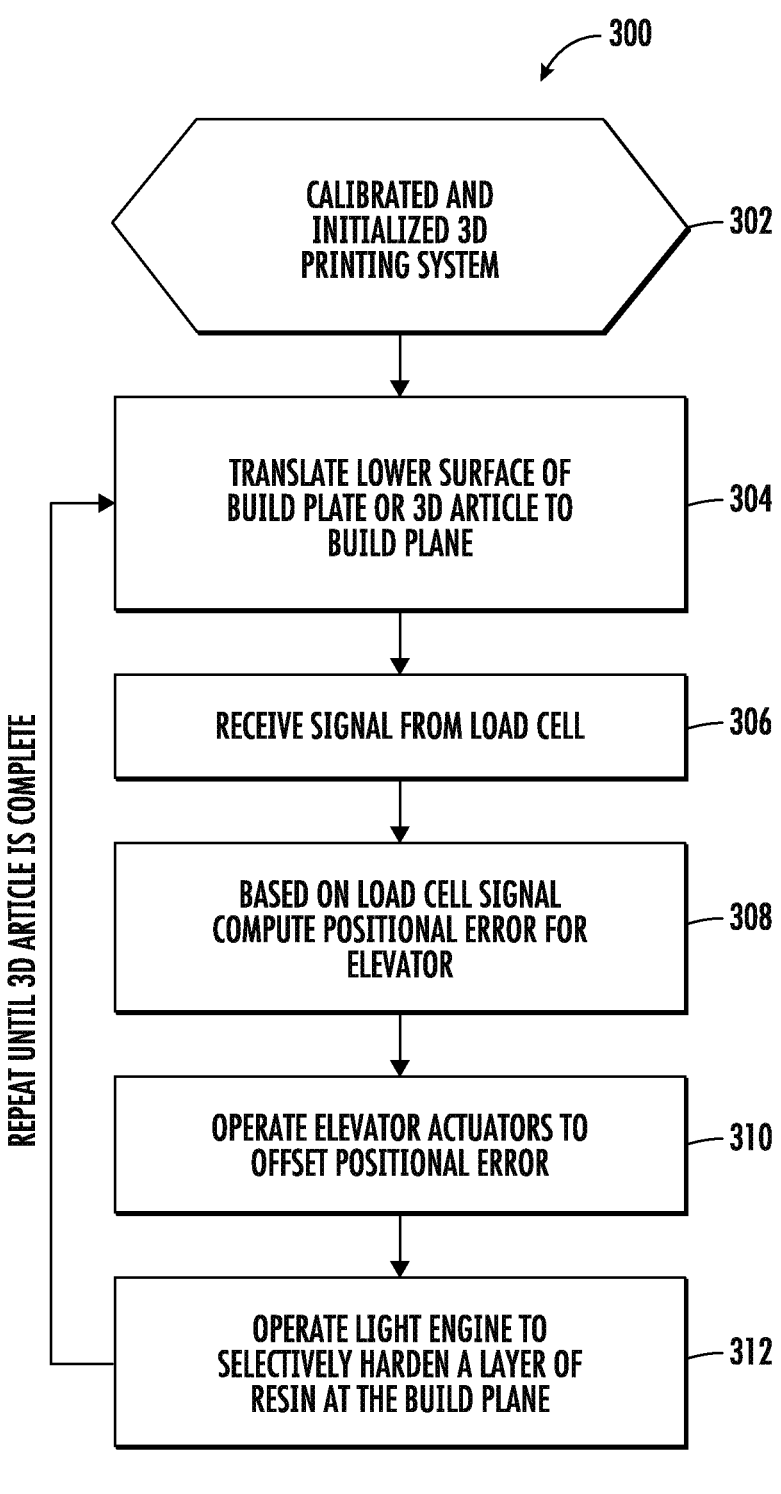
FIG. 16 is a flowchart depicting a method of fabrication that is a portion of the method of FIG. 13.

FIG. 16 is a flowchart depicting a method 300 of manufacturing a 3D article. According to 302, the print engine 8 has been calibrated and initialized using procedures similar to methods 100 and 200. From the calibration of method 100, the controller 88 stores information that correlates readings from load cell 86 with a variation in a height and/or angular inclination of the surface 44. FIG. 14 illustrates an example of that correlation information.

According to 304, the vertical movement mechanism 16 is operated to translate the lower surface 44 of the build pate 38 through the photocurable resin 20 and to a build plane that is above the transparent sheet 30. According to 306, the controller 88 receives a signal from the load cell 86 indicative of viscous drag forces upon the lower surface 44 that would tend to mechanically bend or deflect the lower surface 44 out of plane with the build plane.

According to 308, the controller 88 computes a deflection of the lower surface 44 based upon the signal from the load cell 86 and stored correlation information. As the lower surface 44 is lowered through the resin, the drag force exerts an upward force on the lower surface 44 which can also exert a torque on the elevator along theta-Y about the lateral axis Y. As a result the lower surface 44 may not be as close to the build plane as desired after step 304. Also, the lower surface 44 (or lower surface of the 3D article) may have an inclination that is increasing along axis X.

According to 310, the elevator actuators 62 are adjusted to cancel out a height error and/or a deflected inclination angle error. When the viscous drag is upward—exerting an upward force and/or a torque about lateral axis Y—the adjustment is to raise both actuators 62 to adjust the vertical height of and/or to level the surface 44. The adjustment of the actuators 62 can be an iterative process: (a) During step 310, the actuators are adjusted to correct a fraction of the error computed in step 308. (b) Steps 306 and 308 are repeated. (c) Step 310 is repeated. The procedure cycles through steps 306 to 310 until the error is determined to be corrected in step 308 and then the process moves to step 312.

According to 312, the light engines are operated to selectively harden a layer of the photocurable resin 20 at the build plane and onto the surface 44 or a lower face of the 3D article. Then the method 300 loops back to 304. Steps 304-312 can be repeated until fabrication of the 3D article is complete. Steps 306-310 can be repeated as needed to assure that the surface 44 remains level.

The specific embodiments and applications thereof described above are for illustrative purposes only and do not preclude modifications and variations encompassed by the scope of the following claims.

What is claimed:

1. A method of manufacturing a three-dimensional (3D) article comprising:
   providing a 3D printing system including:
      an elevator configured for translation along a vertical axis, the elevator including an elevator actuator;
      a vertical movement mechanism coupled to the elevator;
      a build platform including a build plate having a lower surface; and an imaging module further including:
         a light engine configured to project pixelated light upward; and
         a distance sensor;
   loading the build platform onto the elevator;
   operating the vertical movement mechanism to lower the lower surface of the build platform into a measurement range with the distance sensor;
   scanning the imaging module along at least one lateral axis;
   concurrent with scanning the distance sensor, receiving a signal from the distance sensor indicative of a plurality of vertical locations along the lateral axis of the lower surface of the build platform;
   computing an inclination of the lower surface of the build platform based upon the signal from the distance sensor; and
   operating the elevator actuator to level the lower surface of the build platform.

2. The method of claim 1 wherein the elevator includes:
   a lower support further including the elevator actuator extending upward from an upper side of the lower support; and
   an upper support with a lower side including a datum surface engaged with the elevator actuator;
   the method includes operating the actuator to modulate an orientation of the upper support with respect to the lower support and with respect to a horizontal axis.

3. The method of claim 2 wherein the elevator actuator includes two elevator actuators, the lower support includes a pin that extends upward from the upper side of the lower support, the two elevator actuators and the pin engage three datum surfaces on the lower side of the upper support, operating the two elevator actuators modulates the orientation of the upper support along two orthogonal horizontal axes.

4. The method of claim 1 wherein the build platform includes a support plate above and coupled to the build plate, loading the build platform includes loading the support plate onto the elevator.

5. The method of claim 4 wherein a plurality of vertical rods couple a lower surface of the support plate to an upper surface of the build plate, loading the build platform onto the elevator includes loading the lower surface of the support plate onto an upper surface of the elevator.

6. The method of claim 4 wherein the elevator includes at least one electromagnet, loading the build platform includes energizing the at least one electromagnet to magnetically hold the support plate to the elevator.

7. The method of claim 1 including scanning and operating the light engine to image a layer of photocurable resin.

8. The method of claim 1 wherein the imaging module includes a plurality of light engines, the method including scanning and operating the plurality of light engines to image a layer of photocurable resin.

9. The method of claim 1 wherein the distance sensor is a confocal sensor, the method including receiving the signal from the confocal sensor.

10. The method of claim 1 wherein the 3D printing system includes a rigid base, a vertical beam extending upward from the rigid base, and a plurality of actuators extending upward from the rigid base, the method further including:
   loading a build vessel onto the rigid base and engaging the plurality of actuators;
   scanning the imaging module along at least one lateral axis along an upper surface of a transparent plate at a lower end of the build vessel;

concurrent with scanning the imaging module, receiving a signal from the distance sensor indicative of a plurality of vertical locations along the lateral axis of the lower surface of the build vessel; and operating the plurality of actuators to adjust a height of the upper surface of the transparent plate of the build vessel.

11. A method of manufacturing a three-dimensional (3D) article comprising:

providing a 3D printing system including:

a rigid base;

a support beam extending upward from the rigid base;

an elevator configured for vertical translation along the support beam, the elevator including:

a lower support slidingly coupled to the support beam and having an upper surface including an elevator actuator extending upward; and an upper support with a lower surface including a datum surface engaged with the actuator;

a vertical movement mechanism coupled to the elevator;

a build platform including a support plate above and coupled to a build plate, the build plate having a lower surface;

an imaging module further including:

a light engine configured to project pixelated light upward; and a distance sensor;

loading the support plate onto an upper surface of the upper support of the elevator;

operating the vertical movement mechanism to lower the lower surface of the build plate into proximity with the distance sensor;

scanning the imaging module along at least one lateral axis;

concurrent with scanning the distance sensor, receiving a signal from the distance sensor indicative of a plurality of vertical locations along the lateral axis of the lower surface of the build platform;

computing an inclination of the lower surface of the build platform based upon the signal from the distance sensor; and operating the elevator actuator to level the lower surface of the build plate.

12. The method of claim 11 wherein the lower support includes a proximal portion that is slidingly coupled to the support beam and a distal portion that extends along a first lateral axis X, the elevator actuator includes two elevator actuators located on the proximal portion of the lower support and a pin that extends upward from the distal portion of the lower support, the upper support includes datum surfaces that engage the two elevator actuators and the pin, operating the elevator actuator includes operating the two elevator actuators rocks the upper support with respect to the pin.

13. The method of claim 11 wherein the upper support includes at least one electromagnet, loading the support plate includes energizing the at least one electromagnet to magnetically hold the support plate to the elevator.

14. The method of claim 11 including scanning and operating the light engine to image a layer of photocurable resin.

15. The method of claim 1 wherein the 3D printing system includes plurality of actuators extending upward from the rigid base, the method further including:

loading a build vessel onto the rigid base and engaging the plurality of actuators;

scanning the imaging module along at least one lateral axis along a surface of a transparent plate at a lower end of the build vessel;

concurrent with scanning the imaging module, receiving a signal from the distance sensor indicative of a plurality of vertical locations along the lateral axis of the surface of the transparent plate of the build vessel;

computing an inclination of the surface of the transparent plate of the build vessel based upon the signal from the distance sensor; and operating the plurality of actuators to adjust a height of the build vessel.

16. A method of manufacturing a three-dimensional (3D) article comprising:

providing a 3D printing system including:

a rigid base having a plurality of base actuators;

an elevator configured for translation along a vertical axis, the elevator including an elevator actuator;

a vertical movement mechanism coupled to the elevator;

a build platform including a build plate having a lower surface; and an imaging module further including:

a light engine configured to project pixelated light upward; and a distance sensor;

a build vessel having a lower end with a transparent plate;

loading the build platform onto the elevator;

operating the vertical movement mechanism to lower the lower surface of the build platform into proximity with the distance sensor;

scanning the imaging module along at least one lateral axis;

concurrent with scanning the distance sensor, receiving a signal from the distance sensor indicative of a plurality of vertical locations along the lateral axis of the lower surface of the build plate;

computing an inclination of the lower surface of the build plate based upon the signal from the distance sensor;

operating the elevator actuator to level the lower surface of the build plate;

loading the build vessel onto the rigid base;

scanning the imaging module along at least one lateral axis;

concurrent with scanning the distance sensor, receiving a signal from the distance sensor indicative of a plurality of vertical locations along the lateral axis of a surface of the transparent plate of build vessel; and operating the plurality of base actuators to adjust a height and orientation of the surface of the transparent plate of the build vessel.

17. The method of claim 16 wherein the surface of the transparent plate is an upper surface of the transparent plate.

18. The method of claim 16 including scanning and operating the light engine to image a layer of photocurable resin.

19. The method of claim 16 wherein the lower surface of the build plate is leveled before adjusting the height of the surface of the transparent plate of the build vessel.

20. The method of claim 19 wherein the build platform is unloaded from the elevator before the height of the surface of the transparent plate of the build vessel is adjusted.

* * * * *